Figure 1:
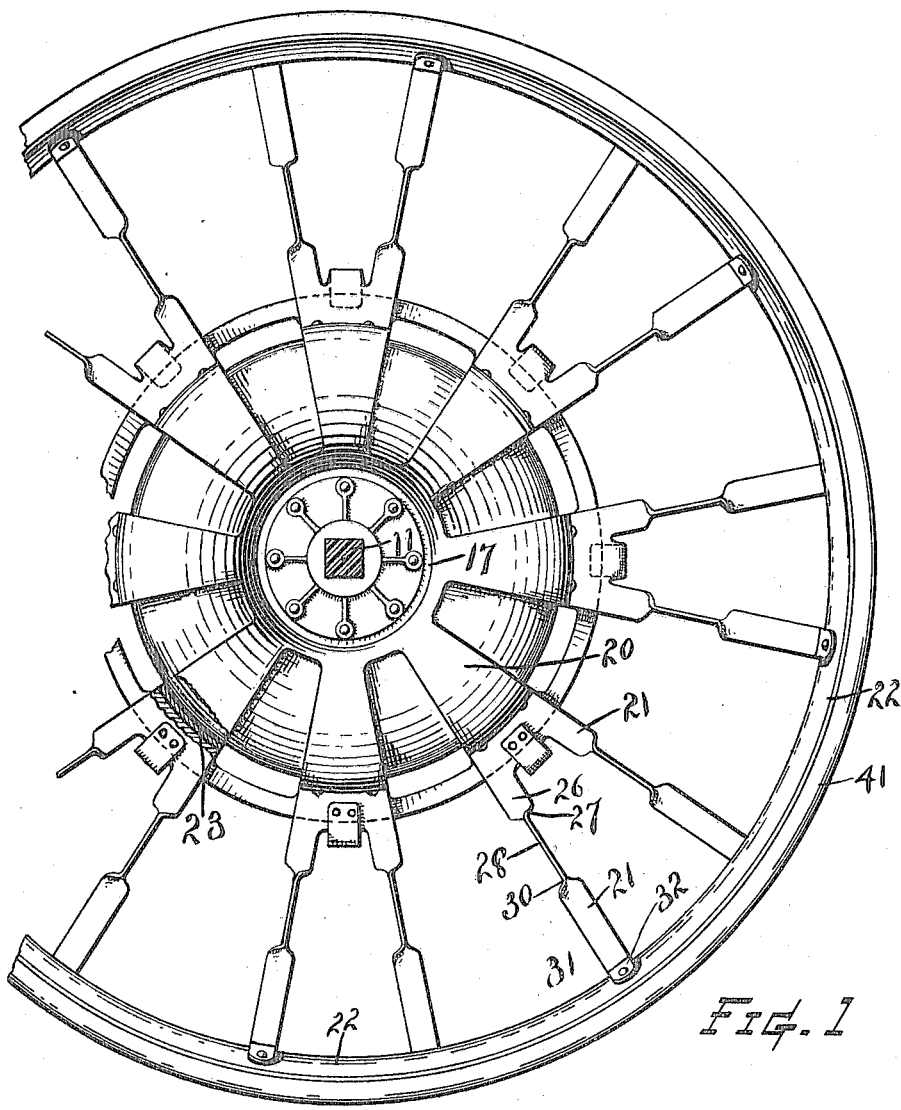

W. KINGSLEY.
VEHICLE WHEEL.
APPLICATION FILED JAN. 29, 1914.

1,135,290.

Patented Apr. 13, 1915.
2 SHEETS—SHEET 1.

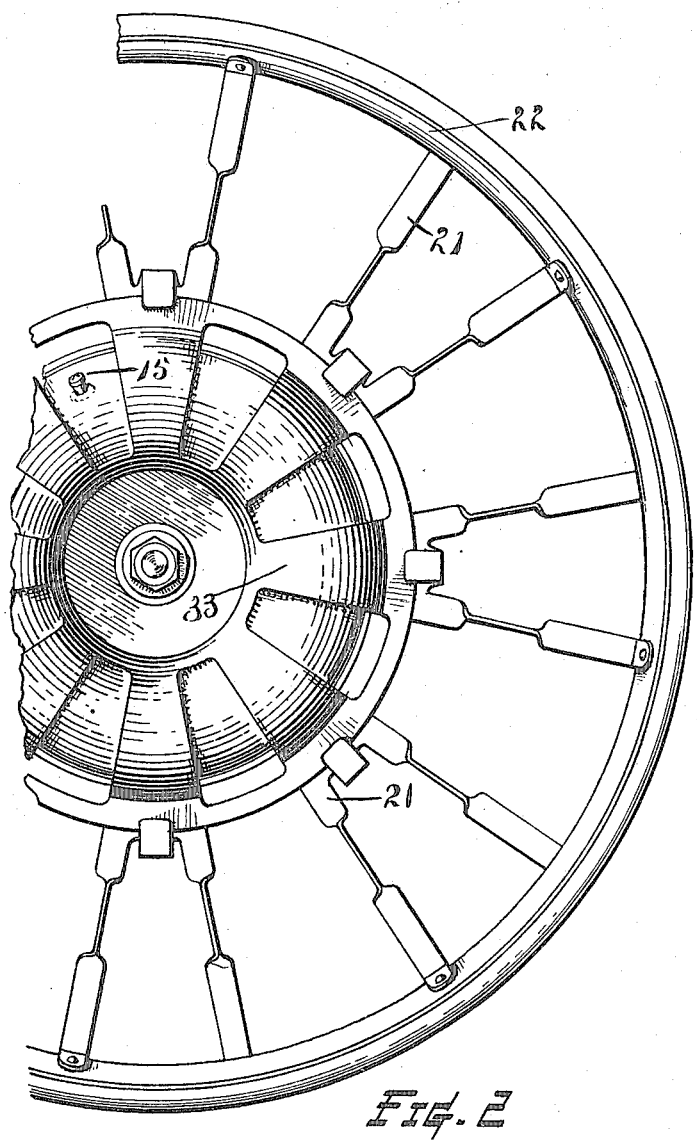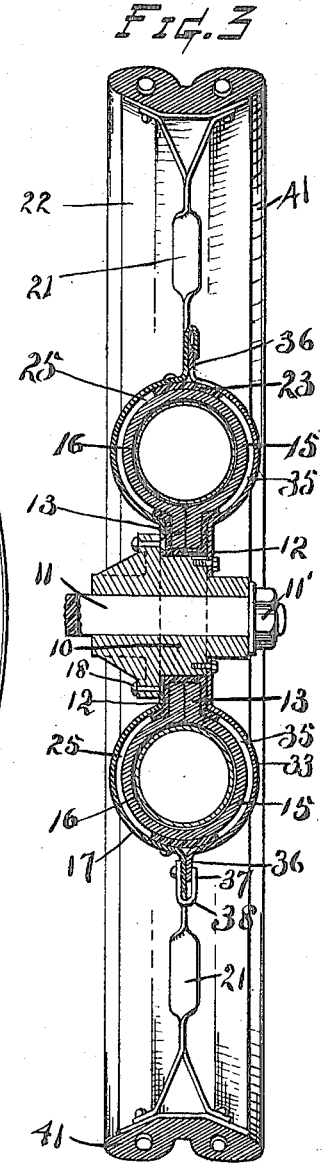

UNITED STATES PATENT OFFICE.

WILLIAM KINGSLEY, OF SEATTLE, WASHINGTON, ASSIGNOR OF ONE-HALF TO ALBERT C. PHILLIPS, OF SEATTLE, WASHINGTON.

VEHICLE-WHEEL.

1,135,290.     Specification of Letters Patent.     Patented Apr. 13, 1915.

Application filed January 29, 1914. Serial No. 815,109.

*To all whom it may concern:*

Be it known that I, WILLIAM KINGSLEY, a citizen of the United States, residing at Seattle, in the county of King and State of Washington, have invented certain new and useful Improvements in Vehicle-Wheels, of which the following is a specification.

This invention relates to vehicle wheels and has for its object to provide certain improvements therein.

The invention consists in the provision of a vehicle wheel combining the resiliency of springs in its radially supporting members and of the shock-absorbing quality of a pneumatic inflated cushion disposed circumjacent the hub of the wheel whereby mutual support is afforded and the advantages of each element is allowed full play.

The invention still further consists in the novel construction, combination and adaptation of parts and devices, affording resiliency, protection and conservation of power as aforesaid, and the provision of means to prevent collapse or undue lateral distortion of the wheel, as under the severe strains encountered in turning corners or when the vehicle may skid or slip sidewise upon the pavement.

In the following specification, descriptive of an embodiment of my invention which is illustrated in the accompanying drawings and finally set forth in the appended claims, I have described the invention incorporated in an automobile wheel, but it is evident that the invention may be otherwise embodied and applied and the spirit of the invention is not circumscribed by the specific description of said embodiment but is intended to extend to the full scope of the claims.

Referring to said drawings, Figure 1 is a fragmentary view in side elevation of a wheel embodying my invention, the view being of the inner side of the wheel. Fig. 2 is a view similar to Fig. 1 taken from the opposite side of the wheel. Fig. 3 is a view in vertical section through the axis of the wheel.

In said views, the reference numeral 10 designates a hub-member having an axially disposed socket adapted to receive the vehicle axle 11 which is secured thereto by the nut $11^1$. Exteriorly, said hub is provided with a rigidly secured rim 12 affording a concentric channel for the reception of the beads 13 of an annular pneumatic casing 15 adapted to contain an inner inflatable tube 16 in a manner analogous to the well-known pneumatic wheel-tire. A valve whereby said casing may be inflated is shown at $15^1$. Said casing may be of any suitable or desired type but may profitably be formed of ramie fiber or other fabric of similar high tensile strength as frictional wear thereon has been reduced to a minimum by my improved construction.

On the inner side of the wheel a resilient metal plate 17 is secured by bolts 18 concentrically of the hub, a central opening being provided for the passage of the hub 10. Said plate is formed with a plurality of symmetrically arranged radially directed integral arms, comprising spring-portions 20 and spokes 21 extending to the wheel-felly 22. The spring-members 20 are laterally curved to be resiliently yielding in radial directions and such curvature extends in substantially an arc concentric with the casing 15 to the plane of the transverse axis of the wheel where the plate-material is continued as said spokes 21 substantially parallel to said plane. Such curvature of the spring-members affords an annular recess for the reception of said casing with openings 22 between said spring-members extending centrally to within proximity of the beads 13 of the casing. Secured to the outer extremities of said spring-members are molded blocks 23 which are rigidly secured to the respective said members and extend symmetrically upon each side of the transverse axial plane of the wheel and are adapted to be engaged by the perimeter of the casing 15. A space 25 may otherwise be provided between the spring-members and the casing. Said spokes 21 may be arranged in several equivalent ways but, as shown, each extends radially of the wheel, as a flat metal bar, for a distance, as at 26, in the plane of said transverse axis, whereat they are given a twist 27 to deflect their flat sides in a plane parallel to the axis of rotation of the wheel, as at 28. The spokes may then be given an additional twist, at 30, to bring their flat sides again in said transverse axial plane whereupon each alternate spoke may be extended in inclined direction, as at 31, to the wheel-felly where they are rigidly connected at 32.

A metal disk 33 is secured to the hub upon the outer side of the wheel opposite to plate 17 and is similarly formed with an annular concavity in opposition to the recessed portion of said plate to receive the casing 15 therebetween in the annular chamber provided thereby.

A space 35 is provided between the casing and the inner surface of said disk-concavity, while the outer perimeter of the disk may be in engagement and superposed upon the casing-engaging block 23 whence it extends in a flanged peripheral lip 36 radially of the wheel in close relation to the inner portion 26 of the spokes. Rigidly mounted on said plate between said spoke-portions 26 are brackets 37 which are offset at 38 to afford a lateral support for the exterior surface of said lip 36, said offset portion extending for approximately one-half its length in said engagement with the lip, additional space being afforded to permit of relative movement of the disk-lip and the resiliently connected spokes. Said disk is shown in the views as symmetrically apertured, as at 40, through which the casing 15 is partially exposed. Said felly 22 is desirably of relatively wide extent to afford an extended base for said spoke portions 31, and is provided with a rubber or cushion tire 41 of any desired type to contact with the road surface.

From the foregoing and an inspection of the accompanying drawings, it will be evident that the spring-members 20 of the plate 17, through their spoke connection with the wheel-felly, afford resiliently yielding connections between the perimeter of the wheel and the axle whereby the shocks due to travel over an uneven road-bed are partially absorbed and distributed, but the further and particular function of said spring-elements is to transmit the effect of such shocks as are not thus absorbed to the pneumatically inflated casing 15, which acts as a cushion for said springs and limits their action to within safe bounds. Opportunity is afforded in said spaces 25 and 35 for the lateral extension of said casing under compression without contact or friction, and the interdependence of the casing and spring are an important and favorable feature of the construction.

The yielding resistance of the springs reduces the shocks transmitted to the casing, while overstrain of the springs is guarded against by the cushion afforded by the casing and their combined resistance is at all times expended in overcoming the jars and shocks.

While the pneumatic casing is about two-thirds to one-half as large in circumference as the ordinary rim-tire and therefore more economical in cost of construction, it presents a pressure area to the inner spring-surface about equal to or greater than would be the case with a rim-tire in contact with a road-surface.

The office of the outer disk 33 is to protect and inclose the casing and to prevent excessive strain on the springs and casing by the provision of the lip 36 engaging with the bottom of the offset portion 38 of brackets 37 upon the extreme concussion or test of said spring and casing, whereupon the disk asserts itself as an additional resilient element and thereby avoids possibility of blowout or breakage of the springs 20. In addition, said disk lends lateral rigidity to the wheel and prevents collapse through its structure and through its sliding connection with said brackets.

In skidding, the springs will be either in tension or compression according to the direction of the strain, and the outer disk will be oppositely affected assisting the springs either way.

The inner side of the wheel is to be considered as a continuous body from the hub to rim and where the outside disk terminates and the former is no longer protected thereby, the spokes are twisted to bring their edges in alinement and radial with the wheel axis to give greater strength in proximity of the wheel-rim against side-pressure or skidding, and at the extreme ends of said spokes they are inclined in alternately opposite directions to give rigidity to the wheel in lateral directions.

Having described my invention, what I claim, is—

1. In a vehicle wheel, in combination, a wheel-hub, a wheel felly, an integral metal plate connecting said hub and felly, said plate including an annular channel in proximity of said hub having a resilient action about its outer portion, and an annular cushion adapted to support the resilient action of said plate.

2. In a vehicle-wheel, the combination with a wheel-hub, a wheel-felly, and a spring metal plate comprising radiating integral spoke connections between said hub and felly, said connections being resiliently yielding in directions toward the axis of rotation of the wheel, of a pneumatic casing coöperating with said connections and affording a cushion to limit the extent of their action.

3. In a vehicle wheel, the combination with a wheel-hub, and a wheel-felly spaced concentrically therefrom, an integral metal plate connecting said hub and felly including radiating spokes and having a resilient portion adjacent said hub, and an annular cushion associated with said hub and adapted to support the resilient action of said plate.

4. In a vehicle wheel, the combination with a wheel-hub, and a wheel-felly spaced concentrically therefrom, an integral metal plate connecting said hub and felly including radiating spokes and having a resilient portion adjacent said hub, and an annular cushion associated with said hub and adapted to support the resilient action of said plate, and a disk secured to said hub oppositely to said plate and slidably engaged at its periphery with said plate.

5. In a vehicle wheel, the combination with a wheel-hub, and a wheel-felly, a metal plate connecting said hub and felly, said plate being formed with radiating spokes and in proximity of said hub with an annular channel having a resilient action toward the wheel axle, and an annular cushion positioned in said channel and adapted to resist the inward flexure of said resilient portion.

6. In a vehicle wheel, the combination with a wheel-hub, and a wheel-felly, a metal plate connecting said hub and felly, said plate being formed with radiating spokes and in proximity of said hub with an annular channel having a resilient action toward the wheel axle, and an annular cushion positioned in said channel and adapted to resist the inward flexure of said resilient portion, and a disk secured to said hub and formed with an annular channel arranged oppositely to the channel in said plate to accommodate said cushion, said disk having a sliding engagement at its periphery with said plate.

7. In a vehicle-wheel, a central hub-member formed with a peripheral channel, a pneumatic casing adapted to be secured in said channel, a wheel-felly disposed exteriorly of said hub and casing, spoke connections between said hub and felly having a resilient portion adapted to engage the periphery of said casing, said spoke connections adjacent their outer extremities being deflected from their planes in proximity of said resilient portion, and a disk secured to said hub and having a sliding engagement with said spoke connections.

8. A vehicle-wheel, comprising in combination, a hub and felly, and spoke connections therebetween, the inner portion of said connections being formed into spring members, the outer portions of said connections being twisted to bring their flat surfaces in parallel with the axis of rotation of the wheel, and thence twisted into its original plane and directed at alternately opposite inclined directions to rigid union with said felly.

Signed at Seattle, Wash., this 19th day of January, 1914.

WILLIAM KINGSLEY.

Witnesses:
HORACE BARNES,
E. PETERSON.